(12) United States Patent
Filippova et al.

(10) Patent No.: US 9,336,186 B1
(45) Date of Patent: May 10, 2016

(54) METHODS AND APPARATUS RELATED TO SENTENCE COMPRESSION

(71) Applicant: Google Inc., Mountain View, CA (US)

(72) Inventors: Ekaterina Filippova, Zurich (CH); Yasemin Altun, Zurich (CH)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 14/050,863

(22) Filed: Oct. 10, 2013

(51) Int. Cl.
*G06F 17/28* (2006.01)
*G06F 17/21* (2006.01)

(52) U.S. Cl.
CPC ..................................... *G06F 17/21* (2013.01)

(58) Field of Classification Search
CPC ... G06F 17/27; G06F 17/2705; G06F 17/271; G06F 17/2715; G06F 17/2785; G06F 17/30
USPC ............................................... 704/9, 1, 7, 10
See application file for complete search history.

(56) References Cited

U.S. PATENT DOCUMENTS

| | | | | |
|---|---|---|---|---|
| 2002/0046018 | A1* | 4/2002 | Marcu ................... | G06F 17/271 704/9 |
| 2010/0010803 | A1* | 1/2010 | Ishikawa ................. | G06F 17/28 704/9 |
| 2011/0270604 | A1* | 11/2011 | Qi .......................... | G06F 17/271 704/9 |

OTHER PUBLICATIONS

Deniel, "Headline generation for Dutch newspaper articles through transformation-based learning", Master's thesis, U of Groningen, Aug. 2008.*

Knigit et al. "Summarization beyond sentence extration: a proabilistic approach to sentence compression", Artificial Intelligence, 2002.*

Bejan, C. et al, "Unsupervised Event Coreference Resolution with Rich Linguistic Features." In Proc. of ACL-10, pp. 1412-1422. Jun. 10, 2010.

Belz, A. et al, "The first surface realization shared task: Overview and Evaluation Results"; In Proc. of ENLG-11, pp. 217-226. Sep. 28, 2011.

Berg-Kirkpatrick et al, "Jointly Learning to Extract and Compress"; in Proc. of ACL-11; 10 pages. Jun. 19, 2011.

Clarke, J. et al, "Models for Sentence Compression: A Comparison Across Domains, Training Requirements and Evaluation Measures"; In Proc. of COLING-ACL-06, pp. 377-385. Jul. 17, 2006.

Clarke J. et al, "Global Inference for Sentence Compression: An Integer Linear Programming Approach"; Journal of Artificial Intelligence Research, 31:399-429. Jan. 1, 2008.

Cohn, T. et al, "Sentence Compression as Tree Transduction"; Journal of Artificial Intelligence Research, 34:637-674. Jan. 1, 2009.

Collins, M., "Discriminative Training Methods for Hidden Markov Models: Theory and Experiments with Perceptron Algorithms"; In Proc. of EMNLP-02, pp. 1-8. Nov. 25, 2002.

(Continued)

*Primary Examiner* — Qi Han
(74) *Attorney, Agent, or Firm* — Middleton Reutlinger

(57) ABSTRACT

Methods and apparatus related to sentence compression. Some implementations are generally directed toward generating a corpus of extractive compressions and associated sentences based on a set of headline, sentence pairs from documents. Some implementations are generally directed toward utilizing a corpus of sentences and associated sentence compressions in training a supervised compression system. Some implementations are generally directed toward determining a compression of a sentence based on edge weights for edges of the sentence that are determined based on weights of features associated with the edges.

21 Claims, 7 Drawing Sheets

(56) References Cited

OTHER PUBLICATIONS

Dolan, B. et al, "Unsupervised Construction of Large Paraphrase Corpora: Exploiting Massively Parallel News Sources"; In Proceedings of the 20th International Conference on Computational Linguistics, Geneva, Switzerland, Aug. 23-27, 2004, pp. 350-356. Aug. 23, 2004.

Dorr, B. et al, "Hedge Trimmer: A Parse-and-Trim Approach to Headline Generation"; In Proceedings of the Text Summarization Workshop at HLT-NAACL-03, Edmonton, Alberta, Canada, 2003, pp. 1-8. May 27, 2003.

Elsner, M. et al, "Learning to Fuse Disparate Sentences"; In Proceedings of the Workshop on Monolingual Text-to-Text Generation, Portland, Oregon, Jun. 24, 2011, pp. 54-63. Jun. 24, 2011.

Filippova, K et al, "Dependency Tree Based Sentence Compression"; In Proc. of INLG-08, pp. 25-32. Jun. 12, 2008.

Freund, Y. et al, "Large Margin Classification Using the Perceptron Algorithm"; 1999; Machine Learning, 37:277-296 Jan. 1, 1999.

Galanis, D. et al, "An Extractive Supervised Two-Stage method for Sentence Compression"; In Proc. of NAACL-HTL-10, pp. 885-893. May 27, 2010.

Galanis, D. et al, "A New Sentence Compression Dataset and Its Use in an Abstractive Generate-and-Rank Sentence Compressor"; In Proc. of UCNLG+Eval-11, pp. 1-11. Jul. 31, 2011.

Galley, M. et al, "Lexicalized Markov Grammars for Sentence Compression"; In Proc. of NAACL-HLT-07, pp. 180-187. Apr. 1, 2007.

Gillick, D. et al, "A Scalable Global Model for Summarization"; In ILP for NLP-09, pp. 10-18. May 31, 2009.

Grefenstette, G., "Producing intelligent telegraphic text reduction to provide an audio scanning service for the blind"; In Working Notes of the Workshop on Intelligent Text Summarization, Palo Alto, California, Mar. 23, 1998, pp. 111-117. Mar. 23, 1998.

Hori, C. et al, "Speech Summarization: An approach through word extraction and a method for evaluation"; IEEE Transactions on Information and Systems, E87-D(1):15-25. Jul. 4, 2004.

Jing, H. et al, "Cut and Paste Based Text Summarization"; In Proc. of NAACL-00, pp. 178-185. Apr. 29, 2000.

Knight, K. et al, "Statistics-Based Summarization-Step One: Sentence Compression"; In Proc. of AAAI-00, pp. 703-711. Jul. 30, 2000.

McDonald, R., "Discriminative Sentence Compression with Soft Syntactic Evidence"; In Proc. of EACL-06, pp. 297-304. Apr. 3, 2006.

Napoles, C., et al, "Paraphrastic Sentence Compression with a Character-Based Metric: Tightening without Deletion"; In proceedings of the Workshop on Monolingual Text-to-Text Generation, Portland, Oregon, Jun. 24, 2011, pp. 84-90. Jun. 24, 2011.

Nomoto, T, "A Generic Sentence Trimmer with CRFs"; In Proc. of ACL-HLT-08, pp. 299-307. Jun. 19, 2008.

Nomoto, T. "A Comparison of Model Free Versus Model Intensive Approaches to Sentence Compression"; In Proc. of EMNLP-09, pp. 391-399. Aug. 6, 2009.

Riezler, S. et al, "Statistical Sentence Condensation Using Ambiguity Packing and Stochastic Disambiguation Methods for Lexical-Functional Grammar"; In Proc. of HTL-NAACL-03, pp. 118-125. May 27, 2003.

Tur4ner, J. et al, "Supervised and Unsupervised Learning for Setence Compression"; In Proc. of ACL-05, pp. 290-297. Jun. 25, 2005.

Woodsend, K. et al, "Automatic Generation of Story Highlights"; In Proc. of ACL-10, pp. 565-574. Jul. 11, 2010.

Woodsend, K. et al, "Multiple Aspect Summarization Using Integer Linear Programming"; In Proc. of EMNLP-12, pp. 233-243. Jul. 12, 2012.

Wubben, S. et al, "Clustering and Matching Headlines for Automatic Paraphrase Acquisition"; In Proc. of ENGL-09, pp. 122-125. Mar. 30, 2009.

\* cited by examiner

| 152 | | |
|---|---|---|
| | Headline | Sentence |
| 152A | Country star Sara Evans marries | Country star Sara Evans has married former University of Alabama quarterback Jay Barker. |
| 152B | Intel to build car batteries | Intel would be building car batteries, expanding its business beyond its core strength, the company said in a statement |
| 152C | Spokesman: Shockey taken to hospital, doing fine | A New Orleans Saints team spokesman says tight end Jeremy Shockey was taken to a hospital but is doing fine. |
| 152D | Regulators shut down small Florida bank | Regulators Friday shut down a small Florida bank, bringing to 119 the number of US bank failures this year amid mounting loan defaults. |
| ... | ... | ... |

FIG. 4

| 154 | | |
|---|---|---|
| | Extractive Compression | Sentence |
| 154A | Country star Sara Evans has married | Country star Sara Evans has married former University of Alabama quarterback Jay Barker. |
| 154B | Intel would be building car batteries | Intel would be building car batteries, expanding its business beyond its core strength, the company said in a statement |
| 154C | spokesman says Jeremy Shockey was taken to a hospital but is doing fine | A New Orleans Saints team spokesman says tight end Jeremy Shockey was taken to a hospital but is doing fine. |
| 154D | Regulators shut down a small Florida bank | Regulators Friday shut down a small Florida bank, bringing to 119 the number of US bank failures this year amid mounting loan defaults. |
| ... | ... | ... |

FIG. 5

METHODS AND APPARATUS RELATED TO SENTENCE COMPRESSION

BACKGROUND

Sentence compression relates to identifying a given sentence consisting of a plurality of terms, and determining a subset of the terms that may be utilized as a compressed version of the sentence. Machine sentence compression generally relates to the automatic compression of natural language sentences to determine a compressed version of a sentence that is grammatical and/or that preserves certain information from the uncompressed sentence.

SUMMARY

This specification is directed to methods and apparatus related to sentence compression. Some implementations of the specification are generally directed toward generating a corpus of extractive compressions and associated sentences based on a set of headline, sentence pairs from documents. The generated corpus of sentences and associated extractive compressions may be utilized in training a supervised sentence compression system. The generated extractive compression for a given sentence of a given pair of the headline, sentence pairs is based on an associated headline of the given pair—but does not necessarily exactly match the headline of the given pair. For example, the extractive compression of the given sentence may be generated based on a minimum subtree of the given sentence that includes nodes of the given sentence that are determined to have open-class terms matching open-class terms of the headline. Such an extractive compression may be unique from the headline of the given pair.

Some implementations of the specification are generally directed toward utilizing a corpus of sentences and associated sentence compressions in training a supervised compression system. For example, the corpus of sentences and associated sentence compressions may be utilized in learning weights for each feature of a set of features for dependency edges connecting terms of sentences. In some implementations, the sentence compressions of the corpus of sentences and associated sentence compressions may include sentence compressions that are each a subtree of a respective associated sentence. In some implementations, the set of features may include syntactic, structural, semantic, and/or lexical features for edges.

Some implementations of the specification are generally directed toward determining a compression of a sentence based on edge weights for dependency edges connecting terms of the sentence, wherein the edge weight for a given edge is determined based on weights of features associated with the given edge. The weights of features associated with the given edge may be weights that were learned from a corpus of sentences and associated sentence compressions.

In some implementations, a computer implemented method for generating a corpus of sentences and sentence compressions may be provided that includes the steps of: determining a set of headline, sentence pairs from documents; each of the headline, sentence pairs having: a headline from a respective document of the documents, the headline having a plurality of headline terms, and a sentence from the respective document, the sentence having a plurality of sentence terms; generating, for each of the headline, sentence pairs of the set, an extractive compression of the sentence, wherein generating the extractive compression for a given pair of the headline, sentence pairs includes: matching headline open-class terms of the headline terms with sentence open-class terms of the sentence terms in one or more nodes of the sentence, determining a minimum subtree of the sentence that includes the nodes of the sentence having the sentence open-class terms matching the headline open-class terms, and determining the extractive compression of the sentence based on the minimum subtree; storing, in one or more databases: a plurality of the generated extractive compressions, and for each stored of the generated extractive compressions, an association to a respective sentence.

This method and other implementations of technology disclosed herein may each optionally include one or more of the following features.

The method may further include training a supervised compression system utilizing the stored of the generated extractive compressions and the associated sentences. Training the supervised compression system may include learning weights for a set of features for edges between nodes of sentences. The set of features may include syntactic, structural, semantic, and lexical features.

The documents from which the set of headline, sentence pairs is determined may be news story documents. In some of those implementations, for each of the headline, sentence pairs the sentence is a first sentence of the respective document.

Determining the set of headline, sentence pairs of the set may include: determining non-conforming headline, sentence pairs from a larger set of headline, sentence pairs; and omitting the non-conforming headline, sentence pairs from the set of headline, sentence pairs. Determining non-conforming headline, sentence pairs may include determining the non-conforming sentence pairs as those that satisfy one or more of the following conditions: the headline is less than a headline threshold number of terms, the sentence is less than a sentence threshold number of terms, the headline does not include a verb, and the headline includes one or more of a noun, verb, adjective, and adverb whose lemma does not appear in the sentence.

Generating the extractive compression of the given pair may include determining a transform of the given sentence; and determining the minimum subtree of the sentence that includes the nodes of the sentence having the sentence open-class terms matching the headline open-class terms may include determining the minimum subtree of the transform that includes the nodes of the transform having the sentence open-class terms matching the headline open-class terms. Generating the transform of the given sentence may include: parsing the given sentence with a dependency parser to generate a source dependency tree having a plurality of part of speech labels connecting the sentence terms; and transforming the source dependency tree to create the transform of the given sentence. Transforming the source dependency tree to create the transform of the given sentence may include: collapsing any auxiliary, determiner, preposition, negation, or possessive of the sentence terms with its head; replacing any preposition part of speech label with its argument; and connecting a dummy root node to every inflected verb.

Matching the headline open-class terms with the sentence open-class terms in the one or more nodes of the transform may include one or more of: determining exact matches between lemmas of the headline open-class terms and lemmas of the terms in the nodes of the sentence; and determining coreference identity between the headline open-class terms and the terms in the nodes of the sentence.

Determining the extractive compression of the sentence based on the minimum subtree may include ordering the sentence terms of the minimum subtree based on their offset in the sentence.

The method may further include determining a number of characters of a given extractive compression of the extractive compressions, and wherein the given extractive compression is only stored in the one or more databases when the number of characters is less than a threshold number.

In some implementations a computer implemented method for determining a compression of a sentence may be provided that includes the steps of: identifying a compression rate; determining a transform of a given sentence having a plurality of sentence terms, the transform including a plurality of nodes and a plurality of edges, each of the nodes including a root node or one or more of the sentence terms, and each of the edges defining a hierarchical link between two of the nodes; determining edge weights for each of the edges, wherein determining the edge weight for a given edge of the edges includes: determining features of the given edge; mapping each of the features of the given edge to weights of corresponding features of a set of features, wherein the weights of the set of features are learned from a corpus of sentences and associated sentence compressions; determining the given edge weight based on the weights of the corresponding features of the set of features; determining a subtree of the transform that: is a valid syntactic tree, that satisfies the compression rate, and whose edges provide an optimal total of the edge weights as compared to any other valid syntactic trees that satisfy the compression rate.

This method and other implementations of technology disclosed herein may each optionally include one or more of the following features.

Determining feature of the given edge may include determining syntactic features, structural features, semantic features, and lexical features of the given edge.

Each of the sentence compressions of the corpus of sentences and associated sentence compressions may be a subtree of a transform of a respective sentence of the sentences. Each feature of the set of features may be represented as one of a plurality of coordinates of a feature vector and each weight of the weights may be a value of a respective one of the coordinates of the feature vector; and mapping each of the features of the given edge to weights of corresponding features of a set of features may include generating a given edge vector having the coordinates of the feature vector and assigning feature present values for the coordinates corresponding to the features of the given edge. Determining the given edge weight may include taking the dot product of the feature vector and the given edge vector.

The method may further include learning the weights of the set of features by iteratively updating the weights based on the corpus of sentences and associated sentence compressions.

Determining the transform of the given sentence may include: parsing the sentence with a dependency parser to generate a source dependency tree having a plurality of part of speech labels connecting the sentence terms; and transforming the source dependency tree to create the transform of the given sentence. Transforming the source dependency tree to create the transform of the given sentence may include: collapsing any auxiliary, determiner, preposition, negation, or possessive of the sentence terms with its head; replacing any preposition part of speech label with its argument; and connecting a dummy root node to every inflected verb of the sentence terms.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein generate a corpus of extractive compressions and associated sentences based on a set of headline, sentence pairs from documents. The extractive compression of a given sentence of a given pair of the headline, sentence pairs may be unique from the headline of the given pair and may represent a new aspect of the sentence of the given pair. The generated corpus of sentences and associated extractive compressions may be utilized in training a supervised sentence compression system. Particular implementations of the subject matter described herein train a supervised compression system based on a corpus of sentences and associated sentence compressions. For example, the corpus of sentences and associated sentence compressions may be utilized in learning weights for a set of features for edges of sentences. The learned weights for the features of edges of sentences may represent new aspects of edges that are based on a corpus of sentences and associated sentence compressions. The learned weights may be utilized in determining compressions for sentences. Particular implementations of the subject matter described herein determine a compression of a sentence based on edge weights for edges of the sentence that are determined based on weights of features associated with the edges. The determined compressions represent a new aspect of the sentence and may optionally be provided to a computing device of a user via one or more applications to provide an improved experience to the user.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a table illustrating example entries of headline, sentence pairs of a content database of FIG. 1.

FIG. 5 is a table illustrating example entries of extractive compressions and associated sentences of the content database of FIG. 1.

DETAILED DESCRIPTION

Figure 1:
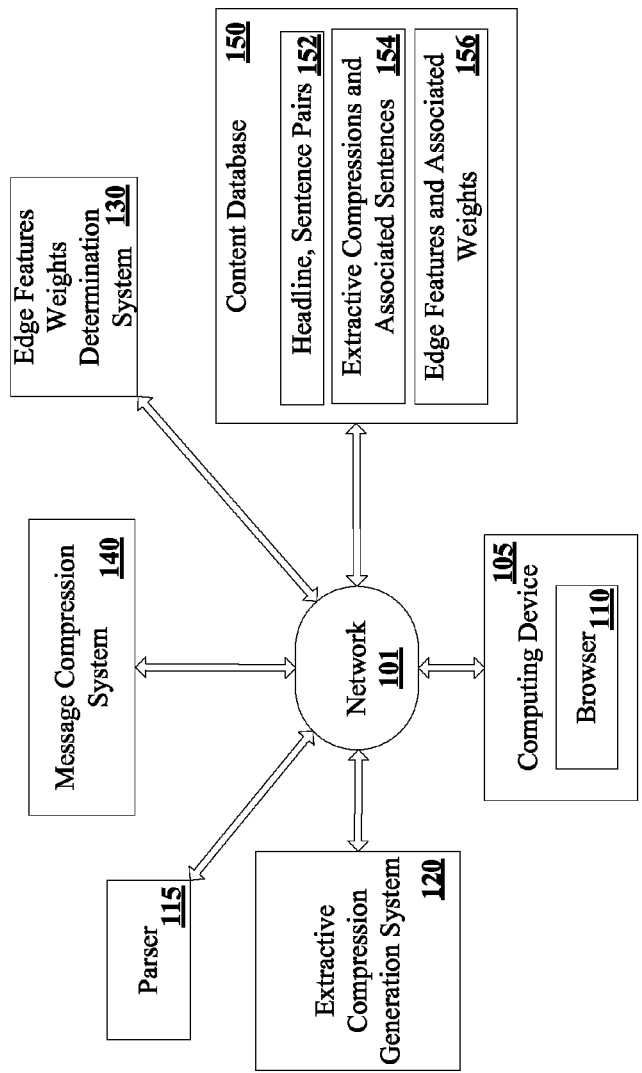
FIG. 1 is a block diagram of an example environment in which a corpus of extractive compressions and associated sentences may be generated; a supervised compression system may be trained utilizing a corpus of sentences and associated sentence compressions; and/or compressions of sentences may be determined.

FIG. 1 illustrates a block diagram of an example environment in which a corpus of extractive compressions and associated sentences may be generated; a supervised compression system may be trained utilizing a corpus of sentences and associated sentence compressions; and/or compressions of sentences may be determined. A communication network 101 is provided that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a computing device 105; a parser 115; an extractive compression system generation system 120; an edge features and feature weights determination system 130; a message compression system 140; and a content database 150.

Generally, the extractive compression generation system 120 may utilize a set of headline, sentence pairs 152 of content database 150 to generate, for each of the headline, sentence pairs 152, an extractive compression of the sentence of the headline, sentence pair. Extractive compressions generated by the extractive compression generation system 120 may be stored, with associations to respective sentences, in a corpus of extractive compressions and associated sentences 154 of content database 150. As described herein, the corpus of sentences and associated extractive compressions 154 may be utilized in training a supervised sentence compression system.

The content database 150 may include one or more storage mediums. In this specification, the term "database" will be used broadly to refer to any collection of data. The data of the database does not need to be structured in any particular way, or structured at all, and it can be stored on storage devices in one or more geographic locations. Thus, for example, the content database 150 may include multiple collections of data, each of which may be organized and accessed differently. For example, the headline, sentence pairs 152 may be a first collection of data on a first set of one or more storage devices and the corpus of extractive compressions and associated sentences 154 may be a second collection of data on a second set of one or more storage devices.

Generally, the edge features weights determination system 130 utilizes a corpus of sentences and associated sentence compressions in training a supervised compression system. For example, the edge features weights determination system 130 may utilize the corpus of sentences and associated sentence compressions in learning weights for edge features for edges of sentences. The weights for edge features learned by the edge features weights determination system 130 may be stored as a set of edge features and associated weights 156 in content database 150. In some implementations, the set of features may include syntactic, structural, semantic, and/or lexical features for the edges of sentences. In some implementations, the utilized corpus of sentences and associated sentence compressions may include sentence compressions that are subtrees of respective associated sentences of the corpus. In some of those implementations, the utilized corpus may be the corpus of extractive compressions and associated sentences 154 generated by the extractive compression generation system 120.

Generally, the message compression system 140 may determine compressions of sentences based on edge weights for edges of the sentence that are determined based on weights of features associated with the edges. The weights of features associated with the edges may be weights that were learned from a corpus of sentences and associated sentence compressions. For example, the weights of features associated with the edges may be determined from the set of edge features and associated weights 156 determined by the edge features weights determination system 130.

The message compression system 140 may determine compressions of one or more sentences of one or more documents and the compressions may optionally be provided to a user via a computing device 105 of the user. For example, in some implementations the compressions may be provided to the user via a browser 110 executing on the computing device 105 and/or through one or more other applications executing on the computing device 105. The message compressions system 140 may determine compressions of one or more sentences in response to a request for all or portions of a given document from the computing device 105 and/or may predetermine one or more compressions of all or portions of the given document.

For the purposes of this specification, a document is any content that is associated with a document address. Documents include webpages, word processing documents, portable document format (PDF) documents, images, video, audio, e-mails, calendar entries, and feed sources, to name just a few. The documents may include content such as, for example: words, phrases, pictures, audio, task identifiers, entity identifiers, etc.; embedded information (e.g., meta information and/or hyperlinks); and/or embedded instructions (e.g., JavaScript scripts).

Generally, the parser 115 may receive natural language input terms, such as a sentence or a headline, and generate a structured representation of the natural language input terms. For example, the parser 115 may generate a hierarchical parse tree of an input sentence or input headline. The parse tree generated by the parser 115 may break down received natural language input into multiple components with annotated information related to the syntactic, structural, semantic, and/or lexical features of the components. For example, the parse tree may be a source dependency tree that breaks the natural language input into multiple components and defines the syntactic relationship between the components.

In some implementations the parser 115, and/or an additional component may tokenize, lemmatize, part-of-speech (PoS) tag, and/or named entity (NE) tag one or more natural language input terms, such as terms of a sentence and/or a headline. Any tokenization, lemmatization, PoS tagging, and/or NE tagging of terms may be provided to, or be otherwise accessible by, one or more components such as those described herein. The extractive compression generation system 120, the edge features weights determination system 130, and/or the message compression system 140 may utilize information from the parser 115 in performing one or more steps of techniques described herein.

The computing device 105, the parser 115, the extractive compression system generation system 120, the edge features and feature weights determination system 130, and the message compression system 140 may each include memory for storage of data and software applications, a processor for accessing data and executing applications, and components that facilitate communication over a network. The operations performed by a respective of the components may optionally be distributed across multiple computer systems. One or more of the components may be implemented as, for example, computer programs running on one or more computing devices in one or more locations that are coupled to each other through a network. Each of the components may share one or more characteristics with the computing device 910 illustrated in FIG. 9 and described herein.

In some implementations, one or more components depicted in FIG. 1 may not be present and/or one or more additional components may be present. For example, in some implementations that only generate a corpus of extractive compressions and associated sentences based on a set of headline, sentence pairs from documents, message compression system 140, edge features weights determination system 130, and/or computing device 105 may be omitted. In some implementations, one or more components depicted in FIG. 1 may be combined into a single component. For example, in some implementations extractive compression generation system 120, message compression system 140, and/or edge features weights determination system 130 may be combined into a single component.

Extractive Compression Generation System

As described, the extractive compression generation system 120 may utilize a set of headline, sentence pairs 152 of content database 150 to generate, for each of the headline, sentence pairs 152, an extractive compression of the sentence of the headline, sentence pair. Each headline and sentence of the headline, sentence pairs 152 represents a headline and sentence that are similar to one another.

In some implementations the headline, sentence pairs 152 may include, or be restricted to, headlines and sentences from news article documents. In some of those implementations the news article documents may be news article documents that are accessible through the Internet. In some implementations, the headline, sentence pairs 152 may include, or be restricted to, headline, sentence pairs wherein the sentence is the first sentence of a respective document and the headline is a headline of the respective document. For example, a news article may have a headline of "British soldier killed in Afghanistan" and the first sentence of the news article may be "Britain's Ministry of Defense says a British soldier was killed in a roadside blast in southern Afghanistan." A headline, sentence pair of such a document would be [British soldier killed in Afghanistan; Britain's Ministry of Defense says a British soldier was killed in a roadside blast in southern Afghanistan].

In some implementations a crawler may be utilized to collect a corpus of articles (such as news articles) in a desired language from the Internet. From every collected article, the headline and the first sentence may be extracted. Multiple of the extracted headlines and sentences may be utilized as the headline, sentence pairs 152. In some implementations, extracted headline, sentence pairs may be filtered to remove any headline, sentence pairs that are determined to be non-conforming. The filtered set of headline, sentence pairs may then be utilized as the headline, sentence pairs 152 for which the extractive compression generation system 120 determines extractive compressions.

In some implementations, the extractive compression generation system 120 may determine whether extracted headline, sentence pairs are conforming and/or non-conforming based on one or more conditions. The one or more conditions may generally be defined to retain headline, sentence pairs that include headlines that are likely to be grammatical and informative—while omitting headline, sentence pairs that are not likely to be grammatical and/or informative.

Figure 6:
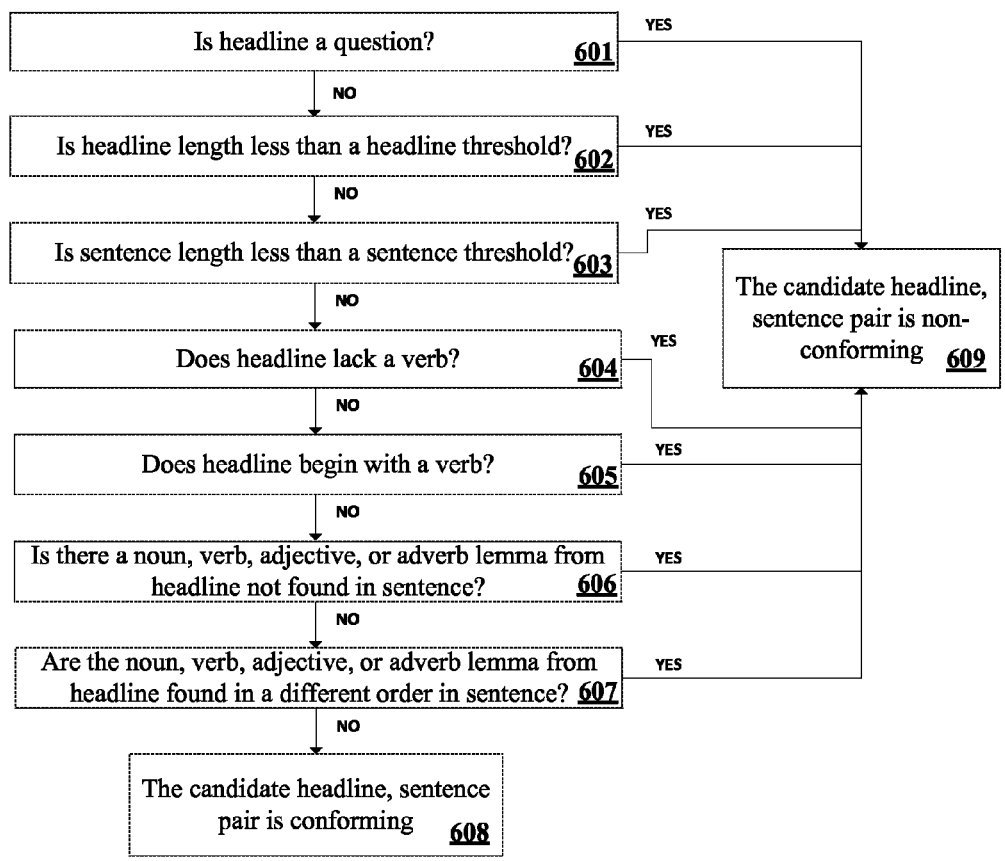
FIG. 6 is a flow chart illustrating an example method of determining whether a headline, sentence pair is conforming or non-conforming.

With reference to FIG. 6, a flow chart illustrates one example method of determining whether a headline, sentence pair is conforming or non-conforming. The example method of FIG. 6 may be applied to each headline, sentence pair of a corpus of candidate headline, sentence pairs to determine which of the headline, sentence pairs are conforming and/or non-conforming. The headline, sentence pairs of the candidate corpus that are determined to be conforming may be utilized as the headline, sentence pairs 152 for which the extractive compression generation system 120 determines extractive compressions. Other implementations may perform the steps of FIG. 6 in a different order, omit certain steps, and/or perform different and/or additional steps than those illustrated in FIG. 6. The steps of the method illustrated in FIG. 6 may be performed by one or more components illustrated in FIG. 1. For example, the extractive compression generation system 120 may perform the steps of the method of FIG. 6.

At step 601, it is determined whether the headline of a headline, sentence pair is a question. If the headline is a question, the headline, sentence pair is identified as non-conforming at step 609. In some implementations the extractive compression generation system 120 may determine whether the headline is a question based on information for the headline provided by the parser 115. For example, the parser 115 may annotate a headline as a question based on the presence of one or more terms (e.g., presence of "what, who, how, etc." at the beginning of the headline, presence of "?" in the headline). In some implementations the extractive compression generation system 120 may determine whether the headline is a question independent of information provided by the parser 115. If the headline is not a question, the method proceeds to step 602.

At step 602, it is determined whether the length of the headline of the headline, sentence pair is less than a headline threshold. The headline threshold is a measure indicative of a minimum acceptable length of a headline. In some implementations the headline threshold may be a number of terms and/or a number of characters. If the headline length is less than the headline threshold, the headline, sentence pair is identified as non-conforming at step 609. In some implementations the extractive compression generation system 120 may determine whether the headline is less than the headline threshold based on information for the headline provided by the parser 115. For example, the parser 115 may annotate a headline with an indication of the number of terms and/or the number of characters in the headline. In some implementations the extractive compression generation system 120 may determine whether the headline is less than a headline threshold independent of information provided by the parser 115. If the headline is not less than the headline threshold, the method proceeds to step 603.

At step 603, it is determined whether the length of the sentence of the headline, sentence pair is less than a sentence threshold. The sentence threshold is a measure indicative of a minimum acceptable length of a sentence. In some implementations the sentence threshold may be a number of terms and/or a number of characters. In some implementations the sentence threshold and the headline threshold may be the same. In some implementations the sentence and headline thresholds may be unique from one another. If the sentence is less than the sentence threshold, the headline, sentence pair is identified as non-conforming at step 609. In some implementations the extractive compression generation system 120 may determine whether the sentence is less than the sentence threshold based on information for the sentence provided by the parser 115. For example, the parser 115 may annotate a sentence with an indication of the number of terms and/or the number of characters in the sentence. In some implementations the extractive compression generation system 120 may determine whether the sentence is less than a sentence threshold independent of information provided by the parser 115. If the sentence is not less than the sentence threshold, the method proceeds to step 604.

At step 604, it is determined whether the headline of the headline, sentence pair lacks a verb. If the headline lacks a verb, the headline, sentence pair is identified as non-conforming at step 609. In some implementations the extractive compression generation system 120 may determine whether the headline lacks a verb based on information for the headline provided by the parser 115. For example, the parser 115 may annotate the terms of the headline with PoS information and the extractive compression generation system 120 may determine whether the PoS information includes an indication of one or more verbs in the headline. If the headline includes a verb, the method proceeds to step 605.

At step 605, it is determined whether the headline of the headline, sentence pair begins with a verb. If the headline begins with a verb, the headline, sentence pair is identified as non-conforming at step 609. In some implementations the extractive compression generation system 120 may determine whether the headline begins with a verb based on information for the headline provided by the parser 115. For example, the parser 115 may annotate the terms of the headline with PoS information and positional information indicating the position of the terms in the headline and extractive compression generation system 120 may determine whether the PoS information and positional information indicate the first term in the headline is a verb. If the headline does not begin with a verb, the method proceeds to step 606.

At step 606, it is determined whether there is a noun, verb, adjective, or adverb lemma from the headline that is not found in the sentence. If there is a noun, verb, adjective, or adverb lemma from the headline that is not found in the sentence, the headline, sentence pair is identified as non-conforming at step 609. In some implementations the extractive compression generation system 120 may determine whether there is a noun, verb, adjective, or adverb lemma from the headline that is not found in the sentence based on information for the headline and the sentence provided by the parser 115. For example, the parser 115 may annotate each of the terms of the headline and the sentence with PoS information and the lemma. As used herein, the term "lemma" refers to a canonical form of a word. For example, the lemma of the term "running" may be "run". Extractive compression generation system 120 may determine whether each lemma from the headline that includes PoS information identifying the lemma as a noun, verb, adjective, or adverb matches a lemma from the sentence that includes PoS information identifying the lemma as a noun, verb, adjective, or adverb. If all noun, verb, adjective, and adverb lemmas from the headline are found in the sentence, the method proceeds to step 607.

At step 607, it is determined whether the noun, verb, adjective, or adverb lemmas from the headline are found in a different order in the sentence. If the noun, verb, adjective, or adverb lemmas from the headline are in a different order in the headline than they are in the sentence, the headline, sentence pair is identified as non-conforming at step 609. In some implementations the extractive compression generation system 120 may determine whether the noun, verb, adjective, or adverb lemmas from the headline are found in a different order in the sentence based on information for the headline and the sentence provided by the parser 115. For example, the parser 115 may annotate each of the terms of the headline and the sentence with PoS information, the lemma, and positional information. Extractive compression generation system 120 may determine whether the lemmas from the headline that include PoS information identifying them as a noun, verb, adjective, or adverb appear in the same order relative to one another as matching lemmas from the sentence that include PoS information identifying them as a noun, verb, adjective, or adverb. For example, for the headline, sentence pair [British soldier killed in Afghanistan; Britain's Ministry of Defense says a British soldier was killed in a roadside blast in southern Afghanistan], the headline includes the noun, verb, adjective, and adverb lemmas "British", "soldier", "kill", and "Afghanistan", in that order. Likewise, the sentence includes matching lemmas "British", "soldier", "kill", and "Afghanistan" in the same order relative to one another as they appear in the headline. If noun, verb, adjective, or adverb lemmas from the headline are in the same order than they are in the sentence, the method proceeds to step 608.

At step 608, the candidate headline, sentence pair is determined to be conforming. As described, the headline, sentence pairs of the candidate corpus that are determined to be conforming may be utilized as the headline, sentence pairs 152 for which the extractive compression generation system 120 determines extractive compressions. Although a particular technique is illustrated in FIG. 6, it is understood that alternative techniques may be utilized to determine whether a headline, sentence pair is conforming and/or non-conforming. For example, one or more of steps 601-607 may be omitted and/or one or more additional analyses of headlines and/or sentences of a candidate headline, sentence pair may be performed. Also, for example, multiple of the questions in steps 601-607 may need to be answered positively for a candidate headline, sentence pair to be identified as non-conforming. For example, a candidate headline, sentence pair may only be identified as non-conforming if it satisfies two or more of the conditions of steps 601-607.

The extractive compression generation system 120 utilizes the set of headline, sentence pairs 152 to generate, for each of the headline, sentence pairs 152, an extractive compression of the sentence of the headline, sentence pair. The generated extractive compressions and associations to respective sentences are stored, for example, as a corpus of extractive compressions and associated sentences 154 in the content database 150. Generally, generating the extractive compression for a given pair of the headline, sentence pairs includes: matching open-class terms of the headline with open-class terms of the sentence; determining a minimum subtree of the sentence that includes the nodes having the matching open-class terms; and determining the extractive compression of the sentence based on the minimum subtree.

As used herein, an "open-class term" generally references a term that is a member of a class of terms that include a relatively large number of terms and/or that openly accepts the addition of new words through processes such as compounding, derivation, inflection, coining, and/or borrowing.

A "closed-class term", on the other hand, generally references a term that is a member of a class of terms that include a relatively small number of terms and/or that is resistant to the addition of new words. What constitutes an open-class term and/or a closed-class term may be dependent on the language of the term. Generally speaking, in English, nouns, verbs, adjective, and adverbs are typically open-class terms; and adpositions, determiners, conjunctions, and pronouns are typically closed-class terms.

Figure 2:
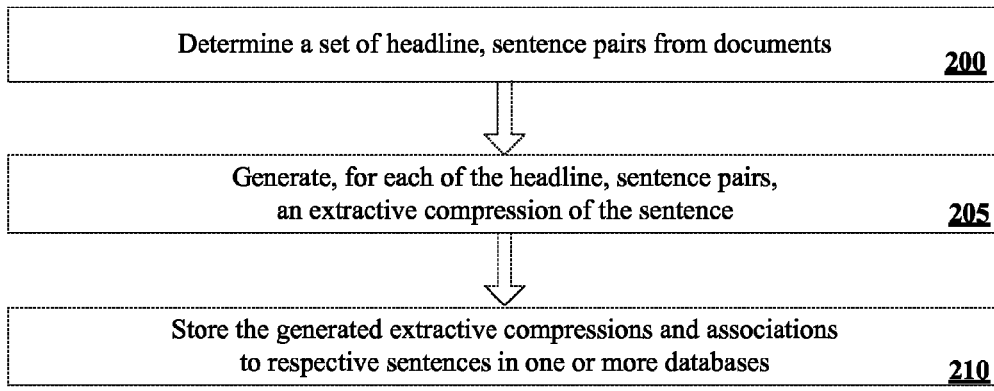
FIG. 2 is a flow chart illustrating an example method of generating a corpus of extractive compressions and associated sentences

With reference to FIG. 2, a flow chart illustrates an example method of generating a corpus of extractive compressions and associated sentences. Other implementations may perform the steps of FIG. 2 in a different order, omit certain steps, and/or perform different and/or additional steps than those illustrated in FIG. 2. The steps of the method illustrated in FIG. 2 may be performed by one or more components illustrated in FIG. 1. For example, the extractive compression generation system 120 may perform the steps of the method of FIG. 2.

At step 200, a set of headline, sentence pairs from documents are determined. For example, the extractive compression generation system 120 may determine the set of headline, sentence pairs from the headline, sentence pairs 152 of the content database 150. As described herein, in some implementations the headline, sentence pairs may include, or be restricted to, headlines and sentences from news article documents and/or to headline, sentence pairs wherein the sentence is the first sentence of a respective document and the headline is a headline of the respective document. In some implementations the headline, sentence pairs may be extracted from a corpus of articles (such as news articles) in a desired language from the Internet. Multiple of the extracted headlines and sentences may be utilized as the headline, sentence pairs. In some implementations, extracted headline, sentence pairs may be filtered to remove any headline, sentence pairs that are determined to be non-conforming. For example, extracted headline, sentence pairs may be filtered as described with respect to the example method of FIG. 6. The filtered set of headline, sentence pairs may then be utilized as the headline, sentence pairs 152 for which the extractive compression generation system 120 determines extractive compressions.

At step 205, for each of the headline, sentence pairs, an extractive compression of the sentence is generated. The extractive compression of each headline, sentence pair is determined based on matching open-class terms of the headline with open-class terms of the sentence, determining a minimum subtree of the sentence that includes the nodes having the matching open-class terms, and determining the extractive compression of the sentence based on the minimum subtree. In some implementations generating the extractive compressions may include one or more of the steps of FIG. 2A that are described below. In some implementations, each headline, sentence pair may be preprocessed to facilitate generation of extractive compressions. Pre-processing may be performed by the parser 115, the extractive compression generation system 120, and/or other components. Pre-processing of a headline, sentence pair may include one or more of tokenizing, lemmatizing, PoS and/or NE tagging of terms of the headline and sentence. Pre-processing of a headline, sentence pair may additionally and/or alternatively include determining a transform of the sentence and/or resolving any pronominal anaphora in the sentence.

At step 210, the generated extractive compressions and associations to respective sentences are stored in one or more databases. For example, the extractive compressions generated by the extractive compression generation system 120 may be stored, with associations to respective sentences, in a corpus of extractive compressions and associated sentences 154 of content database 150. In some implementations the associations to the respective sentences may include storing and/or linking to the actual sentences. In some implementations the associations to the respective sentences may include storing and/or linking to a source dependency tree and/or a transform of the actual sentences. In some implementations the stored extractive compressions may include only identifiers of the ordered terms of the extractive compressions. In some implementations additional information related to the extractive compressions and/or associated sentences may additionally be stored such as, for example, for each of one or more of the extractive compressions: PoS information related to one or more terms of the extractive compression, hierarchical links between terms of the extractive compression, etc.

Figure 2A:
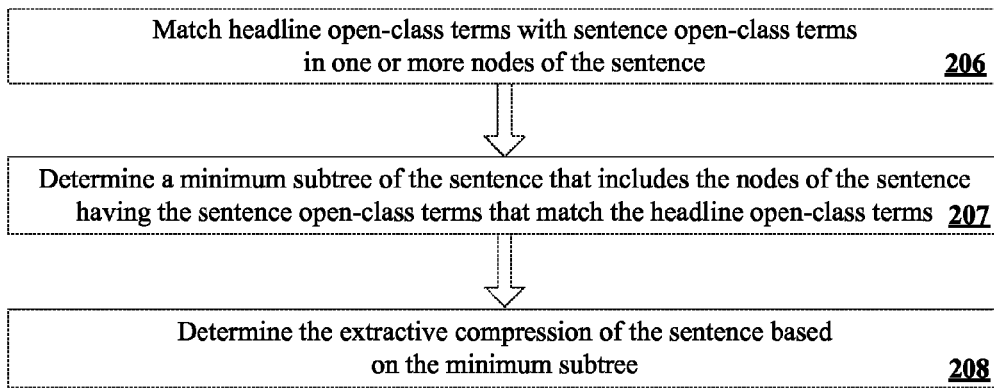
FIG. 2A is a flow chart illustrating an example method of generating an extractive compression of a sentence for a headline, sentence pair.

FIG. 2A is a flow chart illustrating an example method of generating an extractive compression of a sentence for a headline, sentence pair. Other implementations may perform the steps of FIG. 2A in a different order, omit certain steps, and/or perform different and/or additional steps than those illustrated in FIG. 2A. The steps of the method illustrated in FIG. 2A may be performed by one or more components illustrated in FIG. 1. For example, the extractive compression generation system 120 may perform the steps of the method of FIG. 2A.

At step 206, headline open-class terms are matched with sentence open-class terms in one or more nodes of the sentence. In some implementations the nodes may be nodes of a transform of the sentence. Matching of headline and sentence open-class terms may include matching of lemmas of the open-class terms and/or determining coreference identity between the open-class terms. Matching of lemmas of the open-class terms may include exact matching of lemmas of the open-class terms. For example, the open-class term "kill" in a headline and the open-class term "killed" in a sentence may be determined to match since they have matching lemma ("kill"). Determining coreference identity between open-class terms may include matching of NE tags of the open-class terms. For example, given a sentence "Barack Obama said he will attend G20" and a term of the headline being "Obama", "Obama" will be determined to match both "Barack Obama" and "he" in the sentence since "Obama" in the headline references the same entity as "Barack Obama" in the sentence and as "he" in the sentence.

Figure 3A:
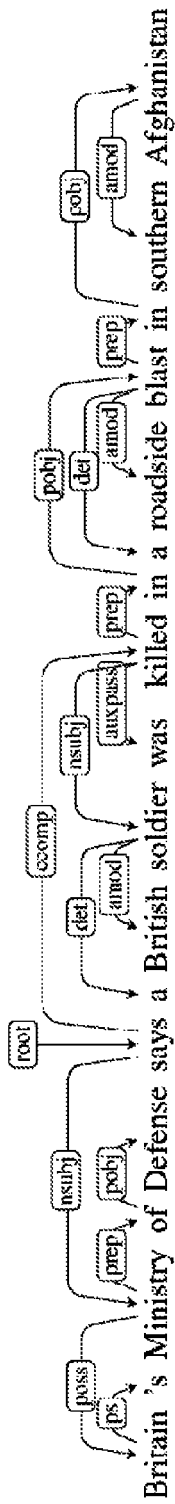
FIG. 3A is an example source dependency tree for a sentence.
Figure 3B:
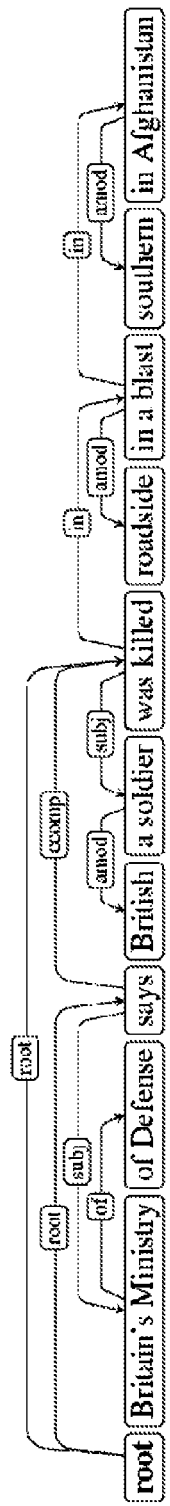
FIG. 3B is an example transform for the sentence of FIG. 3A.

With reference to FIG. 3B, an example of matching headline open-class terms and sentence open-class terms is described. FIG. 3B is an example transform for the sentence "Britain's Ministry of Defense says a British soldier was killed in a roadside blast in southern Afghanistan". The sentence of the transform of FIG. 3B may be paired with a headline of "British soldier killed in Afghanistan". The open-class terms "British", "soldier", "killed", and "Afghanistan" of the headline may be determined to match corresponding terms in the sentence based on exact matching of lemmas of the terms.

As described herein, in some implementations, each headline, sentence pair may be preprocessed to facilitate generation of extractive compressions. Pre-processing may be performed by the parser 115, the extractive compression generation system 120, and/or other component(s). Pre-processing of a headline, sentence pair may include one or more of tokenizing, lemmatizing, PoS and/or NE tagging of terms of the headline and sentence. For example, lemmatizing and PoS and NE tagging of terms may facilitate matching of headline and sentence open-class terms. For example, the PoS tagging may facilitate determination of open-class terms in a headline and sentence and lemmatizing and/or NE tagging may facilitate matching open-class terms between a headline and a sentence.

Pre-processing of a headline, sentence pair may additionally and/or alternatively include determining a transform of the sentence and/or resolving any pronominal anaphora in the sentence. In some implementations, determining a transform of a sentence may include: determining the source dependency tree of the sentence; collapsing any auxiliary, determiner, preposition, negation, and possessive nodes of the source dependency tree with their heads; replacing any preposition PoS label with its argument; and connecting a dummy root node to every inflected verb.

For example, with reference to FIGS. 3A and 3B, an example of determining a transform of a sentence is described. FIG. 3A is an example source dependency tree for the sentence "Britain's Ministry of Defense says a British soldier was killed in a roadside blast in southern Afghanistan." FIG. 3B is an example transform for the sentence "Britain's Ministry of Defense says a British soldier was killed in a roadside blast in southern Afghanistan." The transform of FIG. 3B collapses any auxiliary, determiner, preposition, negation and possessive nodes of the source dependency tree of FIG. 3A with their heads. For example, the possessive node "Ministry" is collapsed with its head "Britain's" and the auxiliary node "was" is collapsed with it's head "killed". The transform of FIG. 3B also replaces any preposition PoS label with its argument. For example, the preposition PoS label between "Ministry" and "of" is replaced with "of" in FIG. 3B and the preposition PoS label between "blast" and "in" of FIG. 3A is replaced with "in" in FIG. 3B. The transform of FIG. 3B also connects a dummy root node to every inflected verb. For example, a dummy root node is connected to "says" and to "killed" in FIG. 3B.

The transform of FIG. 3B is deterministic and reversible and may be implemented in a single top-down tree traversal. In a transform in accordance with the transform described with respect to FIG. 3B, function words and negations are tied to a node including their head words. Thus, no separate constraints will be required to ensure that negation or a determiner is preserved in extractive compressions generated based on such a transform. Also, in a transform in accordance with the transform described with respect to FIG. 3B, the dummy root node enables generation of extractive compressions from any finite sentence of a document.

At step 207, a minimum subtree of the sentence is determined that includes the nodes of the sentence having the sentence open-class terms that match the headline open-class terms. In some implementations the minimum subtree is determined for a transform of the sentence and includes the nodes of the transform having the sentence open-class terms that match the headline open-class terms. For example, with reference to FIGS. 3B and 3C an example of determining a minimum subtree of a transform is described. As described in step 206, the sentence of the transform of FIG. 3B may be paired with a headline of "British soldier killed in Afghanistan"; and the open-class terms "British", "soldier", "killed", and "Afghanistan" may be determined to match corresponding terms in the sentence. The nodes of the transform of FIG. 3B that have the sentence open-class terms that match the headline open-class terms are "British", "a soldier", "was killed", and "in Afghanistan".

Figure 3C:
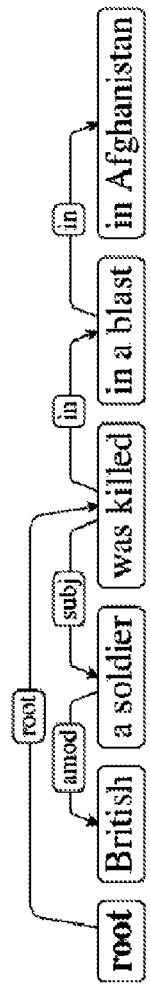
FIG. 3C is a minimum subtree of the transform of FIG. 3B that includes the nodes of the transform of FIG. 3B having open-class terms matching those of the headline "British soldier killed in Afghanistan".

FIG. 3C is a minimum subtree of the transform of FIG. 3B that includes the nodes of the transform of FIG. 3B having open-class terms matching those of the headline "British soldier killed in Afghanistan". The minimum subtree includes the nodes "British", "a soldier", "was killed", and "in Afghanistan" that include open-class terms matching open-class terms of the headline. The node "in a blast" is also determined to be part of the minimum subtree since it is on the path from "was killed" to "in Afghanistan" in the transform of FIG. 3B.

In cases in which multiple nodes of the sentence match a term or entity of the headline, the minimum subtree may be determined such that every term or entity from the headline occurs as many times in the minimum subtree as it does in the headline, but not more times than it occurs in the headline. For example, given a sentence "Barack Obama said he will attend G20" and a term of the headline being "Obama", "Obama" will be determined to match both "Barack Obama" and "he" in the sentence since "Obama" in the headline references the same entity as "Barack Obama" in the sentence and as "he" in the sentence. Since the headline mentions the entity only once, then either "Barack Obama" or "he" may be included in the minimum subtree, but not both. Which node to include in such a situation may be randomly chosen and/or may be based on one or more factors such as which nodes include more popular terms, less popular terms, terms that are more descriptive of the entity, etc.

Figure 3D:
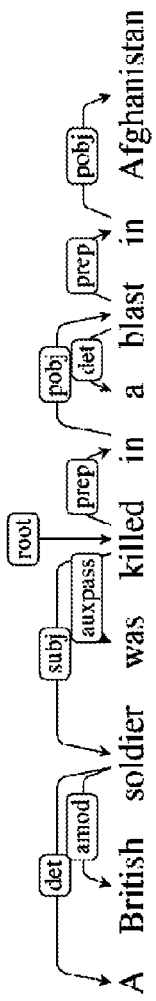
FIG. 3D is an extractive compression for the sentence of FIG. 3A, that is determined based on the minimum subtree of FIG. 3C.

At step 208, the extractive compression of the sentence is determined based on the minimum subtree determined at step 207. For example, the surface form of all of the terms of the minimum subtree may be ordered based on their offsets in the sentence. For example, FIG. 3D illustrates an extractive compression ("A British soldier was killed in a blast in Afghanistan") for the sentence of FIG. 3A, that is determined based on the minimum subtree of FIG. 3C. In FIG. 3D the surface form of all of the terms of the minimum subtree of FIG. 3C have been reordered based on their offset in the sentence "Britain's Ministry of Defense says a British soldier was killed in a roadside blast in southern Afghanistan".

In some implementations, one or more checks may be performed on the extractive compression to determine whether the extractive compression is a desired extractive compression and should be stored as an extractive compression in the corpus of extractive compressions and associated sentences 154. For example, a length of the extractive compression may be compared to the length of the headline. If the length of the extractive compression is greater than then length of the headline by more than a threshold amount, then it may be determined that the extractive compression is not a desired extractive compression. For example, the number of characters of the extractive compression may be determined and compared to the number of characters of the headline. If the number of characters of the extractive compression is greater than 1.5 times the number of characters of the headline, then it may be determined that the extractive compression is not a desired extractive compression. Other length measures may be utilized such as number of terms and/or other threshold amounts may be utilized. For example, other threshold amounts may be greater than 1.5 times the number of characters, greater than 20 characters more than the headline, greater than 4 terms more than the headline, etc.

With reference to FIGS. 4 and 5, additional examples of headline, sentence pairs and extractive compressions for the headline, sentence pairs are provided. FIG. 4 is a table illustrating example entries of headline, sentence pairs 152A-D of the headline, sentence pairs 152. Additional headline sentence pairs may be included in the headline, sentence pairs 152 as indicated by the " . . . " in the last row of the table of FIG. 4. FIG. 5 is a table illustrating example entries of extractive compressions and associated sentences 154A-D of the extractive compressions and associated sentences 154. Each row in the table of FIG. 5 corresponds to a row in FIG. 4. For example, the extractive compression "Country star Sara Evans has married" and associated sentence of entry 154A of FIG. 5 corresponds the headline "Country star Sara Evans marries" and associated sentence of entry 152A of FIG. 4. The extractive compressions of FIG. 5 may be determined based on respective entries of FIG. 4 utilizing the techniques described with respect to FIG. 2A.

Edge Features Weights Determination System

As described, the edge features weights determination system 130 utilizes a corpus of sentences and associated sentence compressions in training a supervised compression system. For example, the edge features weights determination system 130 may utilize the corpus of sentences and associated sentence compressions in learning weights of edge features and may store the weights and associated edge features as a set of edge features and associated weights 156 in content database 150.

Figure 7:
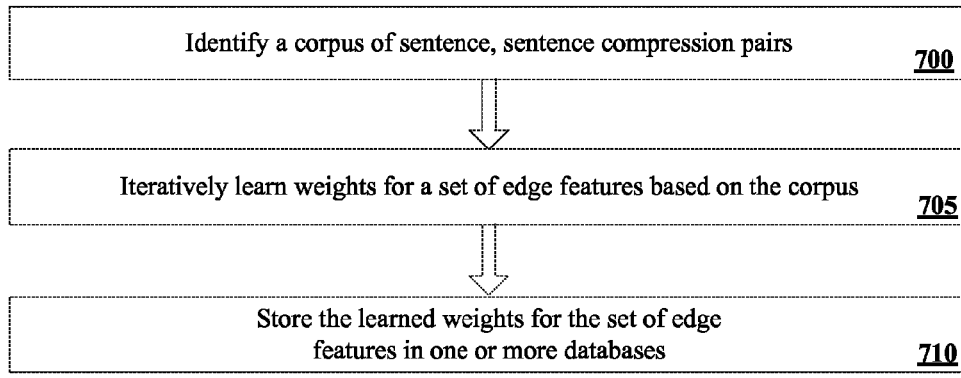
FIG. 7 is a flow chart illustrating an example method of training a supervised compression system utilizing a corpus of sentences and associated sentence compressions.

With reference to FIG. 7, a flow chart illustrates one example method of training a supervised compression system utilizing a corpus of sentences and associated sentence compressions. Other implementations may perform the steps of FIG. 7 in a different order, omit certain steps, and/or perform different and/or additional steps than those illustrated in FIG. 7. The steps of the method illustrated in FIG. 7 may be performed by one or more components illustrated in FIG. 1. For example, the edge features weights determination system 130 may perform the steps of the method of FIG. 7.

At step 700, a corpus of sentences and associated sentence compressions is identified. In some implementations, the identified corpus of sentences and associated sentence compressions may include sentence compressions that are subtrees of respective associated sentences of the corpus. In some of those implementations the identified corpus may be the corpus of extractive compressions and associated sentences 154 generated by the extractive compression generation system 120. In some implementations the identified corpus may include a relatively large number of compressions and associated sentences, such as more than 10,000 compressions and associated sentences.

At step 705, weights are iteratively learned for edge features based on the corpus. The learned weights will be dependent on the sentences and associated sentence compressions of the corpus identified at step 700. In some implementations, the edge features for which weights are learned may include syntactic features, semantic features, structural features, and/or lexical features. The weights are learned based on a plurality of features of dependency edges connecting terms of the sentences of the corpus and the associated sentence compressions of the corpus. In some implementations the syntactic features for which weights are learned may include one or more of:

Edge labels that each represents a label from the head node of an edge to the other node of the edge. For example, the edge labels may include, "subject", "object", "in", "of", etc.

Additional Edge Labels that each represents a label from a head node of an edge to the node of any additional edges ($e_x$); wherein each $e_x$ represents an additional edge from the head node. For example, a given edge may have an edge label of "subject" from the head node of the edge to the other node of the edge and may have an additional edge label of "in" for an additional edge from the head node to an additional node.

Head Positions that each represents a sentence position (e.g., first term in the sentence, second term in the sentence, . . . ) of a head node of an edge.

Node Positions that each represents a sentence position of the non-head node of an edge.

In some implementations the structural features for which weights are learned may include one or more of:

Node depths that each represents a depth of a node of an edge from the root in a sentence transform or other hierarchical representation of the sentence.

Numbers of node children that each represents a number of children of a non-head node of an edge in a sentence transform or other hierarchical representation of the sentence.

Numbers of head children that each represents a number of children of a head node of an edge in a sentence transform or other hierarchical representation of the sentence.

Node character lengths that each represents a number of characters of a node of an edge.

Node number of terms that each represents a number of terms in a node of an edge in a transform of the sentence or other hierarchical representation of the sentence.

In some implementations the semantic features for which weights are learned may include one or more of:

NE tags of heads that each represents a named entity tag for a head node of an edge.

NE tags of nodes that each represents a named entity tag for a non-head node of an edge.

Node negated that represents whether a node of an edge includes a negative particle (e.g., "not").

In some implementations the lexical features for which weights are learned may include one or more of:

Node lemmas that each represents a lemma of a node of an edge;

Probabilities of (label(e), lemma(h)) that each represents a determined probability of the label of an edge given the lemma of the head node of the edge. For example, a certain label may be more likely to occur with a certain lemma than other labels are to occur with the lemma.

Probabilities of (label($e_x$), lemma(h)) that each represents a determined probability of the label from a head node of an edge to a node of any additional edges ($e_x$) given the lemma of the head node.

In some implementations the syntactic features, structural features, and semantic features for which weights are learned may be closed-class features. In some implementations one or more closed-class features may be capped. For example, seven (7) may be set as a maximum value for numerical syntactic and/or semantic features and any edges having a numerical syntactic and/or semantic value over seven (7) may be excluded during the learning of weights and/or the value may be altered to seven (7). In some implementations one or more numerical syntactic and/or semantic features may be bucketed into groups. For example, char_length(n) may be bucketed into five (5) groups, such as a first group of 1-5 characters, a second group of 5-10 characters, etc. One or more of the lexical features may be open-class features. For example, lemma(n) may be an open-class feature as nodes may include one or more open-class terms. In some implementations weights may be learned for one or more compound features that each combine two or more features. For example, a weight may be learned for a combination of two or more features such as two or more of the features described above. For example, a weight may be determined for "labels and depths" compound features that each represents a depth of a node of an edge from the root and a label from the head node of the edge to the other node of the edge. In some implementations the features for a given edge may be determined during the weight learning by edge features and feature weights determination system 130, the parser 115, and/or other component. For example, in some implementations the parser 115 may determine one or more of the features. In some implementations the features for a given edge may be pre-stored in content database 150 and associated with respective extractive compressions and associated sentences of the corpus of extractive compressions and associated sentences 154. Such pre-stored features may be utilized during the learning of weights.

Structured prediction may be utilized to iteratively learn the weights for the syntactic features, structural features, and/or lexical features based on the corpus of sentences and associated sentence compressions. In the utilized structured prediction, each sentence compression of the corpus of sentences and associated sentence compressions is assumed to be a correct "oracle" compression for its associated sentence.

In some implementations, the learned weights may be determined as a feature vector w, wherein each coordinate of the feature vector w represents a feature such as one of the features discussed above. For example, a first coordinate of the feature vector w may represent an edge label of "object", a second coordinate of the feature vector w may represent an edge label of "subject", a third coordinate of the feature vector w may represent an edge label of "in", etc. The value for each of the coordinates of the feature vector w may represent the learned weight of a respective coordinate.

At every iteration of the learning, for every sentence of the corpus, the optimal sentence compression solution for the sentence is determined utilizing integer linear programming (ILP) under the current feature vector w. For example, techniques described below with respect to the message compression system 140 may be utilized to determine an optimal sentence compression solution for the sentence under the current feature vector w. The maximum permitted sentence compression length for each sentence utilizing ILP may set to be the same as the length of the "oracle" compression for that sentence (the sentence compression associated with the sentence in the corpus). Since the "oracle" compression is a subtree of the associated sentence, it represents a feasible solution for ILP. The feature vector w is updated at any given iteration if there is a mismatch between the predicted and the oracle sets of edges for all the features of the edges with a non-zero net count. In other words, those features of the feature vector that are features of edges included in the "oracle" compression, but not the predicted compression, will have their weights updated. More formally, given a sentence with: the set of edges E; features f(e) of each edge (e) of the set of edges E, wherein each f(e) is a vector having the same coordinates as feature vector w with a "1" value (or other "present" value) for those coordinates whose corresponding edge feature is present in the edge and a "0" value (or other "not present" value) for those coordinates whose corresponding edge feature is not present in the edge); an associated "oracle" compression C c E; and compression $C \subseteq E$ predicted at iteration t, the feature vector w at t+1 is given by:

$$w_{t+1} = w_t + \sum_{e \in C/C_t} f(e) - \sum_{e \in C_t/C} f(e)$$

At the next step, the optimal sentence compression solution $C_{t+1}$ for the sentence is determined utilizing ILP under the current feature vector $w=w_{t+1}$. In some implementations the feature vector w may be set to a default, such as all zeros, at an initial iteration of the weights learning. In some implementations the feature vector w may be averaged over all the $w_t$'s so that features whose weight fluctuate a lot during training are penalized. The learned feature vector w includes a plurality of coordinates representing a set of features and values for the coordinates that each represents a weight of a respective feature. For example, a first coordinate of the feature vector w may represent edge label "subject" and include a value that represents a weight that is based on the iterative learning for all sentences of the corpus having one or more edges with a "subject" label from the head node of the edge to the other node of the edge. Also, for example, a second coordinate of the feature vector may represent edge label "in" and include a value that represents a weight that is based on the iterative learning for all sentences of the corpus having one or more edges with an "in" label from the head node of the edge to the other node of the edge. Also, for example another coordinate of the feature vector may represent a node depth of "1" and include a weight that represents a weight that is based on the iterative learning for all sentences of the corpus having one or more edges having a node that is one position away from the root in a transform of the sentence.

At step 710, the learned weights for the set of edge features are stored in one or more databases. For example, the learned weights may be stored, with associations to respective edge features, as edge features and associated weights 156 of content database 150. In some implementations the feature vector w described in step 705 may be stored as the learned weights and the association to respective edge features may be the coordinates of the feature vector w. In some implementations the learned weights and/or the associations to respective edge features may be stored in another format.

The determined weightings for the set of features are weightings for a rich feature set of edge features that are based on a large corpus of sentences and associated sentence compressions. For example, the set of features may include multiple edge labels, such as edge labels of "object", "subject", "in", and "of", each with an associated weight. Also, for example, the set of features may further include multiple head positions such as "first", "second", "third", etc., each with an associated weight. Also, for example, the set of features may further include multiple node depths such as "1", "2", "3", etc., each with an associated weight. As described, the set of features may include each of one or more semantic, structural, syntactic, and/or lexical features, such as those described above, and an associated weight for each. The determined weights for the edge features may be universally utilized to determine edge weights in compressions of sentences as described below.

Message Compression System

As described, the message compression system 140 may determine compressions of a sentence based on edge weights for edges of the sentence that are determined based on weights of features associated with the edges. The weights of features associated with the edges may be weights that were learned from a corpus of sentences and associated sentence compressions. For example, the weights of features associated with the edges may be determined from the set of edge features and associated weights 156 determined by the edge features and feature weights determination system 130.

Figure 8:
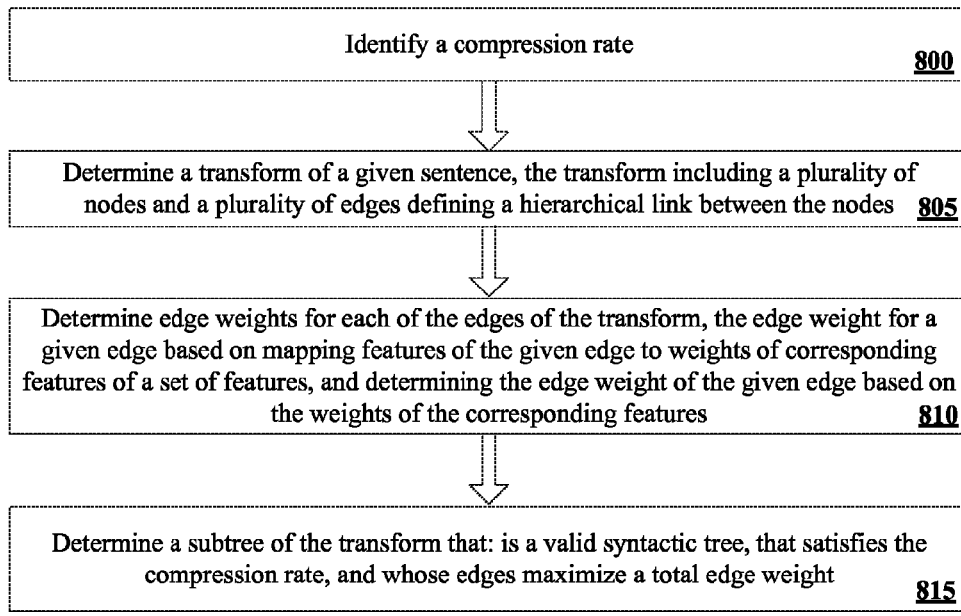
FIG. 8 is a flow chart illustrating an example method of determining compressions of sentences.

With reference to FIG. 8, a flow chart illustrates one example method of determining compressions of sentences. Other implementations may perform the steps of FIG. 8 in a different order, omit certain steps, and/or perform different and/or additional steps than those illustrated in FIG. 8. The steps of the method illustrated in FIG. 8 may be performed by one or more components illustrated in FIG. 1. For example, the message compression system 140 may perform the steps of the method of FIG. 8.

At step 800, a compression rate is identified. Generally, the compression rate identifies how aggressively a sentence should be compressed. In some implementations the compression rate may indicate a desired number of characters and/or terms that should be included in a compressed sentence. In some implementations the compression rate may indicate a percentage of terms and/or characters of the sentence that should be removed from a sentence in the compressed sentence. In some implementations, the compression rate may be a set measure. For example, in determining compressed sentences to utilize as headlines or summaries for a particular application it may be desirable to compress the sentence to 140 characters or less. In some implementations, the compression rate may be based on a particular computing device for which the compression is being performed. For example, the message compression system 130 may compress a sentence in response to a request from the computing device 105 based on information related to a compression rate appropriate for the computing device 105. For example, the information may include a screen size of the computing device 105, a device type (e.g., tablet, mobile phone, desktop) of the computing device 105, an application utilized by the computing device 105 such as a type of web browser 110, and/or other information that may be indicative of a compression rate that is appropriate for the computing device 105.

At step 805, a transform of a given sentence to be compressed is determined. The transform of the given sentence includes a plurality of nodes and a plurality of edges defining a hierarchical link between the nodes. For example, as described above with reference to FIGS. 3A and 3B, an example transform for the sentence "Britain's Ministry of Defense says a British soldier was killed in a roadside blast in southern Afghanistan" is provided in FIG. 3B. The transform of FIG. 3B collapses any auxiliary, determiner, preposition, negation and possessive nodes of the source dependency tree with their heads. The transform of FIG. 3B also replaces any preposition PoS label with its argument and connects a dummy root node to every inflected verb. In some implementations the transform may be determined by the message compression system 140. In some implementations the transform may be determined by the parser 115 and/or other component and be provided to, or otherwise accessible to, the message compression system 140.

At step 810, edge weights are determined for each of the edges of the transform of the sentence. The edge weight for a given edge is based on mapping features of the given edge to weights of corresponding features of a set of features, and determining the edge weight of the given edge based on the weights of the corresponding features.

For example, determined features of an edge may include one or more syntactic, structural, semantic, and/or lexical features determined by the message compression system 140, the parser 115, and/or other component.

For example, the syntactic features of an edge may include one or more of:
Edge label that represents a label from the head node of the edge to the other node of the edge.
Additional Edge Label(s) that each represent a label from the head node of the edge to the node of any additional edges ($e_x$); wherein each $e_x$ represents an additional edge from the head node.
Head Position that represents the sentence position of the head node of the edge.
Node Position that represents the sentence position of the non-head node of the edge.

Also, for example, the structural features of an edge may include one or more of:
Node depth that represents the depth of a node of the edge from the root in a sentence transform or other hierarchical representation of the sentence.
Number of node children that represents the number of children of the non-head node of the edge in a sentence transform or other hierarchical representation of the sentence.
Number of head children that represents the number of children of the head node of the edge in a sentence transform or other hierarchical representation of the sentence.
Node character length that represents the number of characters of a node of the edge.
Node number of terms that represents the number of terms in the node of the edge in a transform of the sentence or other hierarchical representation of the sentence.

Also, for example, the semantic features of an edge may include one or more of:
NE tag of head that represents a named entity tag for the head node of the edge.
NE tag of nodes that represents a named entity tag for the non-head node of the edge.
Node negated that represents whether a node of the edge includes a negative particle (e.g., "not").

Also, for example, the lexical features of an edge may include one or more of:
Node lemma that represents a lemma of a node of the edge;
Probability of (label(e), lemma(h)) that represents a determined probability of the label of the edge given the lemma of the head node of the edge.
Probabilities of (label($e_x$), lemma(h)) that represents a determined probability of the label from the head node of the edge to a node of any additional edges ($e_x$) given the lemma of the head node.

In some implementations the determined features of the given edge may be mapped to weights of corresponding edge features of a set of edge features. For example, each of the features of the given edge may be mapped to a corresponding feature of the edge features and associated weights 156. For example, if the given edge has an edge label of "subject" it may be mapped to the corresponding feature of edge label "subject" in the edge features and associated weights 156. The weight of the given edge may be determined based on the weights of all of the corresponding features of the edge features and associated weights 156. For example, the weight of the given edge may be determined as the sum, average, and/or other determined value of the weights of all of the corresponding features the edge features and associated weights 156.

In some implementations, the determined features of the given edge may be mapped to weights of corresponding features of a set of edge features by determining a vector of binary variables f(e), wherein the coordinates of f(e) correspond to the coordinates of the feature vector w and wherein a "1" is set in a coordinate of the vector f(e) if the corresponding feature is present in the given edge and a "0" is set in a coordinate of the vector f(e) if the corresponding feature is not present in the given edge. For example, if the given edge has an edge label of "subject" the vector f(e) may have a "1" in the coordinate corresponding to the coordinate of feature vector w that is associated with the feature of edge label "subject".

The coordinates of f(e) corresponding to all other edge labels will be set to "0" since the edge label of the given edge is "subject" and not any other edge label. In some of those implementations, the edge weight of the given edge may be determined by taking the dot product of the vector f(e) and the feature vector w, as illustrated in the equation below:

weight of given edge=feature vector $w \cdot f(e)$

At step 815 a subtree of the transform is determined that: is a valid syntactic tree, that satisfies the compression rate, and whose edges optimize a total edge weight. The edges of a subtree optimize a total edge weight if the sum of the weight of the edges (as determined at step 810) for the subtree is greater than the sum of the weight of the edges of any other subtrees that are a valid syntactic tree for the transform and that satisfy the compression rate.

In some implementations, the objective function for determining a subtree of the transform may be defined over set $X=\{x_e, e \in E\}$ of binary variables, corresponding to the set E of edges e, as illustrated by the following equation:

$$f(X) \sum_{e \in E} x_e \times w(e),$$

wherein w(e) denotes the weight of edge e. This constrained optimization problem may be solved, under sentence tree structure constraints and compression rate constraints, using ILP. If $x_e$ is resolved to 1, the respective edge is retained, otherwise it is deleted. The sentence tree structure constraints may enforce at most one parent for every node and structure connectivity (i.e., no disconnected subtrees). Given that length( ) denotes the length of the node to which edge e points and a is indicative of the compression rate (e.g., a may be the maximum permitted length for the compression), the length constraint may be:

$$\sum_{e \in E} x_e \times \text{length}(\text{node}(e)) \leq \alpha$$

In some implementations a compression rate may not be provided at step 800. For example, it may be desirable to provide shorter sentences to a user and/or a user may desire to view shorter sentences, but the user and/or the computing device of the user may not dictate a strict length constraint for compressions. In some of those implementations, a reranker which compares compressions generated for a range of possible lengths can be employed to find a single compression (e.g., mean edge weight in the solution or a language model-based score).

Figure 9:
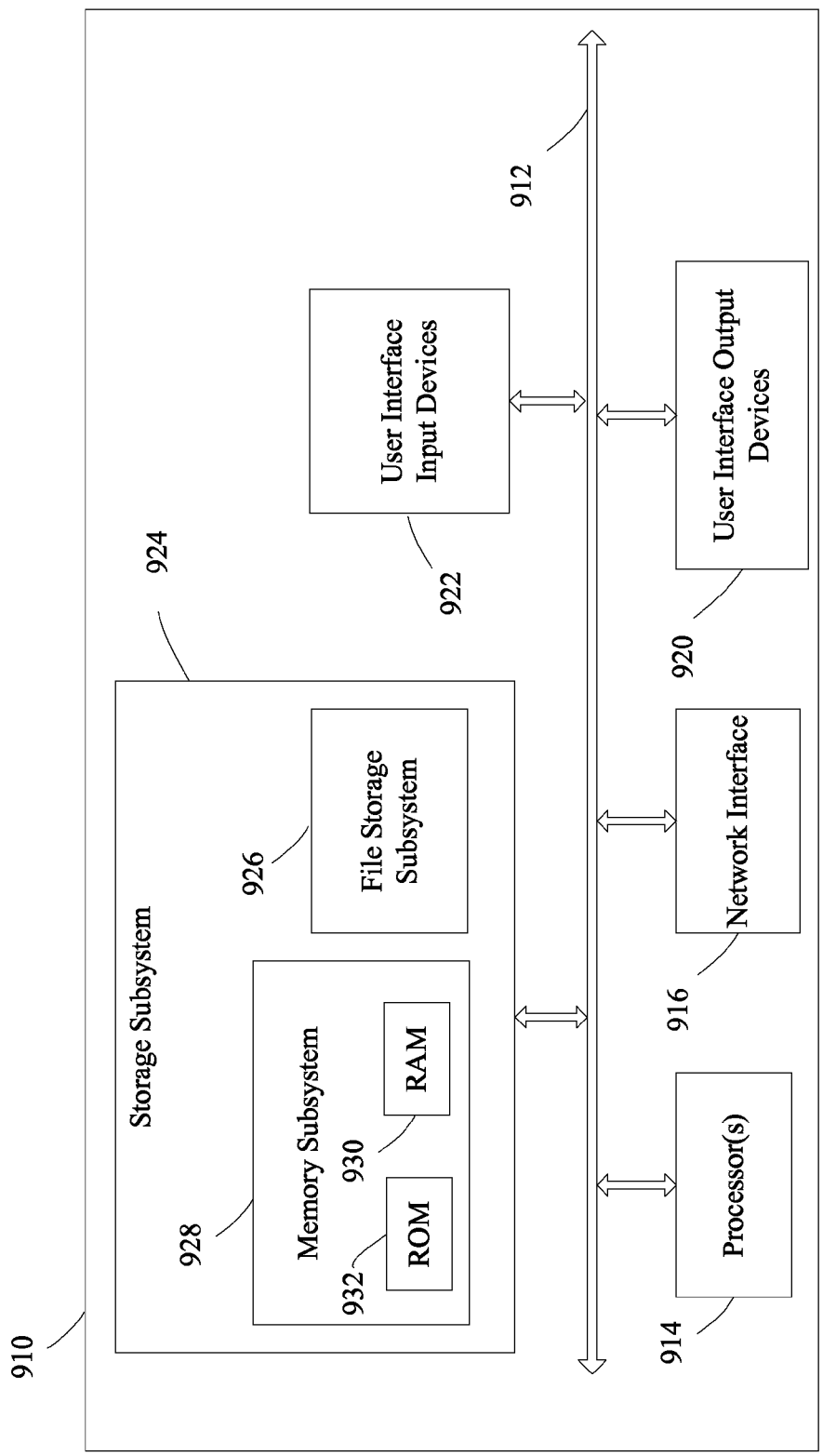
FIG. 9 illustrates a block diagram of an example computing device.

FIG. 9 is a block diagram of an example computing device system 910. Computing device system 910 typically includes at least one processor 914 which communicates with a number of peripheral devices via bus subsystem 912. These peripheral devices may include a storage subsystem 924, including, for example, a memory subsystem 926 and a file storage subsystem 928, user interface input devices 922, user interface output devices 920, and a network interface subsystem 916. The input and output devices allow user interaction with computing device system 910. Network interface subsystem 916 provides an interface to outside networks and is coupled to corresponding interface devices in other computing device systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device system 910 to the user or to another machine or computing device system.

Storage subsystem 924 stores programming and data constructs that provide the functionality of some or all of the modules described herein. For example, the storage subsystem 924 may include the logic to generate a corpus of extractive compressions and associated sentences; train a supervised compression system utilizing a corpus of sentences and associated sentence compressions; and/or determine compressions of sentences.

These software modules are generally executed by processor 914 alone or in combination with other processors. Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processor(s) 914.

Bus subsystem 912 provides a mechanism for letting the various components and subsystems of computing device system 910 communicate with each other as intended. Although bus subsystem 912 is shown schematically as a single bus, alternative implementations of the bus subsystem may use multiple busses.

Computing device system 910 can be of varying types including a workstation, server, computing cluster, blade server, server farm, or any other data processing system or computing device. Due to the ever-changing nature of computing devices and networks, the description of computing device system 910 depicted in FIG. 9 is intended only as a specific example for purposes of illustrating some implementations. Many other configurations of computing device system 910 are possible having more or fewer components than the computing device system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A computer implemented method, comprising:
   determining, by one or more computing systems, a set of headline, sentence pairs from documents; each of the headline, sentence pairs having:
      a headline from a respective document of the documents, the headline having a plurality of headline terms, and
      a sentence from the respective document, the sentence having a plurality of sentence terms;
   generating, by one or more of the computing systems for each of the headline, sentence pairs of the set, an extractive compression of the sentence, wherein generating the extractive compression for a given pair of the headline, sentence pairs includes:
      matching, by one or more of the computing systems, headline open-class terms of the headline terms with sentence open-class terms of the sentence terms in one or more nodes of the sentence,
      determining, by one or more of the computing systems, a minimum subtree of the sentence that includes the nodes of the sentence having the sentence open-class terms matching the headline open-class terms, and
      determining, by one or more of the computing systems, the extractive compression of the sentence based on the minimum subtree;
   storing, by one or more of the computing systems in one or more databases:
      a plurality of the generated extractive compressions, and for each stored of the generated extractive compressions, an association to a respective said sentence; and
   training a supervised compression computing system utilizing the stored of the generated extractive compressions and the associated sentences, wherein training the supervised compression system comprises:
      iteratively learning, by the supervised compression computing system, weights for each of a plurality of coordinates of a feature vector, the coordinates representing features for edges between sentence nodes, and the iteratively learning comprising updating the weights of the feature vector by the supervised compression computing system during a plurality of iterations of the learning based on the generated extractive compressions and the associated sentences.

2. The method of claim 1, wherein the features include syntactic, structural, semantic, and lexical features.

3. The method of claim 1, wherein the documents from which the set of headline, sentence pairs is determined are news story documents.

4. The method of claim 3, wherein for each of the headline, sentence pairs the sentence is a first sentence of the respective document.

5. The method of claim 1, wherein determining the set of headline, sentence pairs of the set includes:
   determining non-conforming headline, sentence pairs from a larger set of headline, sentence pairs; and
   omitting the non-conforming headline, sentence pairs from the set of headline, sentence pairs.

6. The method of claim 5, wherein determining non-conforming headline, sentence pairs includes determining the non-conforming sentence pairs as those that satisfy one or more of the following conditions:
   the headline is less than a headline threshold number of terms,
   the sentence is less than a sentence threshold number of terms,
   the headline does not include a verb, and
   the headline includes one or more of a noun, verb, adjective, and adverb whose lemma does not appear in the sentence.

7. The method of claim 1, wherein generating the extractive compression of the given pair includes:
   determining a transform of the given sentence; and
   wherein determining the minimum subtree of the sentence that includes the nodes of the sentence having the sentence open-class terms matching the headline open-class terms includes determining the minimum subtree of the transform that includes the nodes of the transform having the sentence open-class terms matching the headline open-class terms.

8. The method of claim 7, wherein generating the transform of the given sentence includes:
   parsing the given sentence with a dependency parser to generate a source dependency tree having a plurality of part of speech labels connecting the sentence terms; and
   transforming the source dependency tree to create the transform of the given sentence.

9. The method of claim 8, wherein transforming the source dependency tree to create the transform of the given sentence includes:
   collapsing any auxiliary, determiner, preposition, negation, or possessive of the sentence terms with its head;
   replacing any preposition part of speech label with its argument; and
   connecting a dummy root node to every inflected verb.

10. The method of claim 1, wherein matching the headline open-class terms with the sentence open-class terms in the one or more nodes of the transform includes one or more of:
    determining exact matches between lemmas of the headline open-class terms and lemmas of the terms in the nodes of the sentence; and
    determining coreference identity between the headline open-class terms and the terms in the nodes of the sentence.

11. The method of claim 1, wherein determining the extractive compression of the sentence based on the minimum subtree includes ordering the sentence terms of the minimum subtree based on their offset in the sentence.

12. The method of claim 1, further comprising determining a number of characters of a given extractive compression of the extractive compressions, and wherein the given extractive compression is only stored in the one or more databases when the number of characters is less than a threshold number.

13. A computer implemented method for determining a compression of a sentence, comprising:
  identifying, by one or more computing systems, a compression rate;
  determining, by one or more of the computing systems, a transform of a given sentence having a plurality of sentence terms, the transform including a plurality of nodes and a plurality of edges, each of the nodes including a root node or one or more of the sentence terms, and each of the edges defining a hierarchical link between two of the nodes;
  determining by a trained compression computing system of the computing systems, edge weights for each of the edges, wherein determining the edge weight for a given edge of the edges includes:
    determining, by the trained compression computing system, features of the given edge;
    mapping, by the trained compression computing system, each of the features of the given edge to weights of corresponding features of a set of features, wherein the weights of the set of features are iteratively learned by the trained compression system based on updating the weights during a plurality of iterations of learning based on a corpus of sentences and associated sentence compressions; and
    determining, by the trained compression computing system, m the given edge weight based on the weights of the corresponding features of the set of features;
  determining, by one or more of the computing systems, a subtree of the transform that: is a valid syntactic tree, that satisfies the compression rate, and whose edges provide an optimal total of the edge weights as compared to any other valid syntactic trees that satisfy the compression rate.

14. The method of claim 13, wherein determining features of the given edge includes determining syntactic features, structural features, semantic features, and lexical features of the given edge.

15. The method of claim 13, wherein each of the sentence compressions of the corpus of sentences and associated sentence compressions is a subtree of a transform of a respective sentence of the sentences.

16. The method of claim 15, wherein each feature of the set of features is represented as one of a plurality of coordinates of a feature vector and each weight of the weights is a value of a respective one of said coordinates of the feature vector; and
  wherein mapping each of the features of the given edge to weights of corresponding features of a set of features includes generating a given edge vector having the coordinates of the feature vector and assigning feature present values for the coordinates corresponding to the features of the given edge.

17. The method of claim 16, wherein determining the given edge weight includes taking the dot product of the feature vector and the given edge vector.

18. The method of claim 13, further comprising learning the weights of the set of features by iteratively updating the weights based on the corpus of sentences and associated sentence compressions.

19. The method of claim 13, wherein determining the transform of the given sentence includes:
  parsing the sentence with a dependency parser to generate a source dependency tree having a plurality of part of speech labels connecting the sentence terms; and
  transforming the source dependency tree to create the transform of the given sentence.

20. The method of claim 19, wherein transforming the source dependency tree to create the transform of the given sentence includes:
  collapsing any auxiliary, determiner, preposition, negation, or possessive of the sentence terms with its head;
  replacing any preposition part of speech label with its argument; and
  connecting a dummy root node to every inflected verb of the sentence terms.

21. A system, comprising:
memory storing instructions; and
one or more processors operable to execute the instructions stored in the memory;
wherein the instructions comprise instructions to perform operations to:
determine a set of headline, sentence pairs from documents; each of the headline, sentence pairs having:
  a headline from a respective document of the documents, the headline having a plurality of headline terms, and
  a sentence from the respective document, the sentence having a plurality of sentence terms;
generate, for each of the headline, sentence pairs of the set, an extractive compression of the sentence, wherein generating the extractive compression for a given pair of the headline, sentence pairs includes:
  matching headline open-class terms of the headline terms with sentence open-class terms of the sentence terms in one or more nodes of the sentence,
  determining a minimum subtree of the sentence that includes the nodes of the sentence having the sentence open-class terms matching the headline open-class terms, and
  determining the extractive compression of the sentence based on the minimum subtree;
store, in one or more databases:
  a plurality of the generated extractive compressions, and for each stored of the generated extractive compressions, an association to a respective said sentence; and
train a supervised compression computing system utilizing the stored of the generated extractive compressions and the associated sentences, wherein training the supervised compression system comprises:
  iteratively learning, by the supervised compression computing system, weights for each of a plurality of coordinates of a feature vector, the coordinates representing features for edges between sentence nodes, and the iteratively learning comprising updating the weights of the feature vector by the supervised compression computing system during a plurality of iterations of the learning based on the generated extractive compressions and the associated sentences.

* * * * *